Dec. 8, 1953 A. COATES 2,662,108
FILLING AND VENTING MEANS FOR ELECTRIC BATTERIES
Filed Oct. 25, 1949
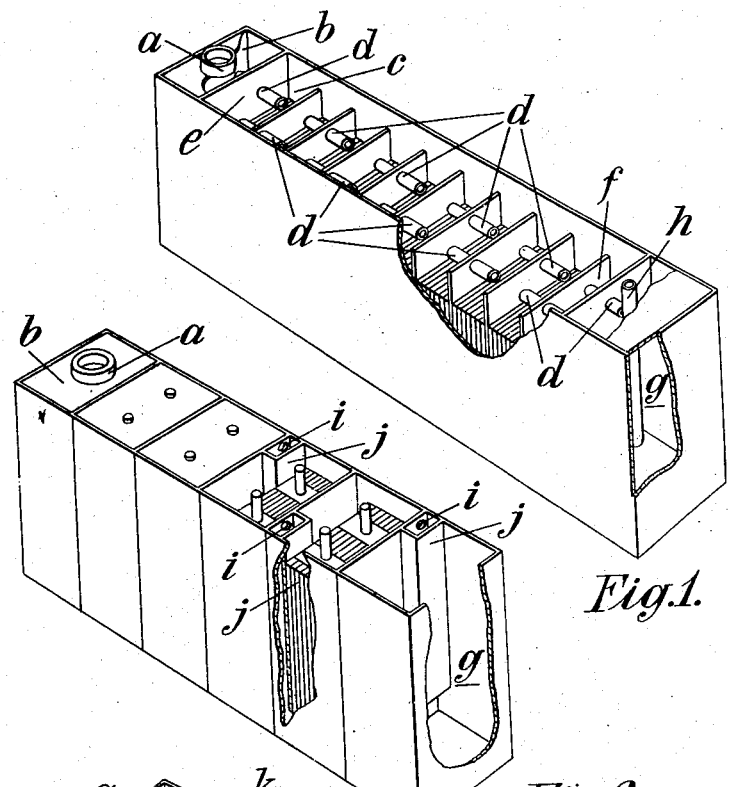
Fig.1.
Fig.2.
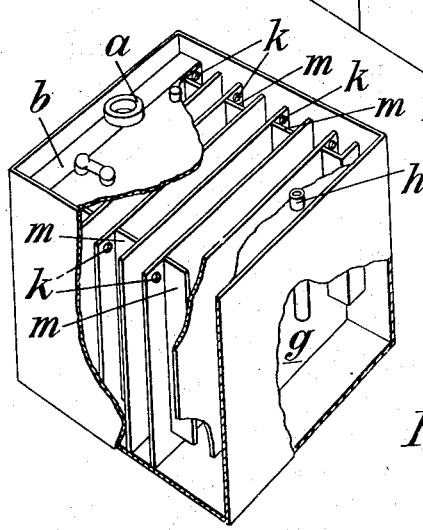
Fig.3.
Inventor
A. Coates Patented Dec. 8, 1953

2,662,108

UNITED STATES PATENT OFFICE 2,662,108

FILLING AND VENTING MEANS FOR ELECTRIC BATTERIES

Archibald Coates, Manchester, England, assignor to The Chloride Electrical Storage Company Limited, Manchester, England, a British company Application October 25, 1949, Serial No. 123,321

Claims priority, application Great Britain November 19, 1948

1 Claim. (Cl. 136—162)

This invention relates to multi-cell primary or secondary electric batteries and is concerned with the filling and venting means of such batteries.

In normal practice each cell of a multi-cell battery is filled separately with electrolyte and, in the case of high-tension batteries, the process is unduly cumbersome and necessitates the provision of a filling vent and a vent plug for each cell. Furthermore, if the battery is to be made unspillable, it is necessary to provide each cell with a suitable non-spill device.

The object of the present invention is to simplify and improve the filling and venting arrangements of multi-cell batteries.

In accordance with the present invention the cells of a multi-cell battery are interconnected in series by overflow orifices or tubes, the filling orifice for all the cells being at one end of the series and there being a reservoir at the other end of the series into which any excess electrolyte can overflow from the last cell of the series, such reservoir having also an atmospheric vent connection which serves as the vent for all the cells of the series. Such vent may be of the unspillable type. With this improvement, a vessel containing a definite volume of electrolyte, can be emptied into the battery through the single filling orifice so as to prime all the cells with the correct amount of electrolyte.

Referring to the accompanying explanatory drawings:

Figure 1 is an isometric projection showing a battery comprising a number of cells adapted to be filled and vented as a unit in one convenient form in accordance with this invention.

Figures 2 and 3 show two modifications.

In Figure 1, the battery comprises a filler $a$ by which electrolyte is introduced to the compartment $b$ at one end of the battery. Such compartment may or may not contain a cell of the battery. From this compartment electrolyte overflows into the cell $c$ by the tube $d$ passing through the division wall $e$, such tube being at the desired normal level of the electrolyte in the cell. The electrolyte overflows from cell to cell through similarly arranged tubes $d$ and finally any overflow from the end cell $f$ passes into the overflow reservoir $g$ which has a vent pipe $h$ thereon which may incorporate a non-spill device.

It will be noted that the overflow tube $d$ by which electrolyte is introduced to a cell is at the opposite side or end of the top thereof to the overflow tube by which electrolyte passes out of the cell to the next of the series.

With the arrangement described, electrolyte is poured into the compartment $b$ until overflow takes place from the end cell into the overflow reservoir $g$, when all the cells will be filled to the desired level. All the cells are vented by the tubes $d$ to the reservoir $g$ and the vent pipe $h$. The filler $a$ is of course closed by a blind or solid cap after filling the battery. The cell lids or battery cover make gas tight joints with the divisions between the cells so that venting must be through the tubes $d$.

In the Figure 2 arrangement, there are overflow apertures $i$ in the division walls between the respective cells, the aperture $i$ through which electrolyte enters a cell being at the opposite side or end of the cell to the aperture by which electrolyte leaves a cell to pass to the next cell in the battery. There are vertical ducts $j$ over the apertures at the side where electrolyte enters the cells and such ducts extend low down in the cell being supplied, so that the electrolyte must pass across a cell from one duct to the next, thus ensuring the desired uniformity in the level of the electrolyte in all the cells. The battery has a filler at one end and an overflow reservoir with vent at the other end as in the Figure 1 construction. The venting of the cells is by the apertures $i$ and ducts $j$ to the reservoir $g$.

In the Figure 3 arrangement, instead of using complete ducts as in Figure 2 for the electrolyte to pass down into a cell, the overflow apertures $k$ are arranged beyond vertical partitions $m$ at opposite sides or ends of each cell, such partitions stopping short of the bottom of the cells. The effect is the same as in the Figure 2 construction to cause the electrolyte to pass across each cell before going from one cell to the next.

It will be appreciated that there is in all cases communication between the cells by way of the tubes $d$ or apertures $i$ or $k$ and the reservoir $g$ for the escape of air or gas to the vent $h$ whilst filling, and, in the case of secondary cells, whilst filling and charging the battery.

There may be in the improved battery a certain amount of electrical leakage and self discharge, but by adjusting the size and length of each overflow connection, the electrical leakage can be restricted to any desired extent. Further still, in the case of Figure 1 additional restriction may be ensured by treating the intercommunicating pipes $d$ with a non-wetting agent which prevents a continuous wetting of the overflow connections. In the constructions shown in Figures 2 and 3 this object may be achieved by treating the battery container internally with a non-wetting agent.

The improved battery can be stored for a long period in an unfilled condition without appreciable deterioration. When required for use it can be readily primed with the correct amount of electrolyte.

Due to its low internal self-discharge rate, the battery can be permitted to stand for periods of fairly long duration before discharge is commenced.

What I claim is:

A multi-cell electric storage battery comprising means defining a plurality of cells, a filling chamber at one end of the cells, a reservoir chamber at the other end of the cells constituting a common vent and electrolyte overflow chamber for all of the cells, means defining a filling opening in the filling chamber whereby electrolyte may be introduced therein, means constituting an electrolyte path extending from the filling chamber through each cell to the reservoir chamber, such electrolyte path constituting means including apertures in the walls between the cells, the inlet aperture to each cell being at the opposite side of the cell to the outlet aperture so that electrolyte entering the cell must pass across the cell, the apertures all being in the same plane and serving to vent the series of cells to the reservoir chamber, a duct extending vertically of each cell, the outlet side of each aperture being disposed in said duct, and means constituting an atmospheric vent on the reservoir chamber.

ARCHIBALD COATES.

References Cited in the file of this patent

UNITED STATES PATENTS

| Number | Name | Date |
| --- | --- | --- |
| 944,079 | Decker | Dec. 21, 1909 |
| 1,380,770 | Carpenter | June 7, 1921 |
| 1,381,298 | Gill | June 14, 1921 |
| 1,383,411 | Longstreet | July 5, 1921 |

FOREIGN PATENTS

| Number | Country | Date |
| --- | --- | --- |
| 16,268 | Great Britain | of 1896 |
| 102,999 | Great Britain | Jan. 11, 1917 |
| 272,013 | Great Britain | June 9, 1927 |
| 295,516 | Great Britain | Aug. 16, 1928 |